United States Patent
Ushiyama et al.

(10) Patent No.: US 9,592,784 B2
(45) Date of Patent: Mar. 14, 2017

(54) VEHICLE SEAT AND MANUFACTURING METHOD OF SEAT PAD

(71) Applicant: TOYOTA BOSHOKU KABUSHIKI KAISHA, Aichi-ken (JP)

(72) Inventors: Takeshi Ushiyama, Toyota (JP); Hideo Sahashi, Komaki (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/929,822

(22) Filed: Nov. 2, 2015

(65) Prior Publication Data

US 2016/0129874 A1    May 12, 2016

(30) Foreign Application Priority Data

Nov. 7, 2014    (JP) .................................. 2014-226762

(51) Int. Cl.
  *B60R 21/207* (2006.01)
  *B60N 2/58* (2006.01)
  *B60R 21/16* (2006.01)

(52) U.S. Cl.
  CPC .... *B60R 21/207* (2013.01); *B60N 2002/5808* (2013.01); *B60R 2021/161* (2013.01)

(58) Field of Classification Search
  CPC ............ B60R 21/207; B60R 2021/161; B60N 2002/5808
  See application file for complete search history.

(56) References Cited

U.S. PATENT DOCUMENTS

| | | | | |
|---|---|---|---|---|
| 2010/0156071 A1* | 6/2010 | Taguchi | ............... | B60R 21/207 280/730.2 |
| 2011/0057426 A1* | 3/2011 | Nakamura | .......... | B60R 21/2176 280/730.2 |
| 2014/0070595 A1* | 3/2014 | Taniguchi | ........... | B29C 37/0032 297/452.59 |
| 2014/0284907 A1* | 9/2014 | Akiyama | .............. | B60R 21/207 280/730.2 |
| 2015/0115578 A1* | 4/2015 | Sahashi | .................. | B60N 2/427 280/728.3 |
| 2015/0307000 A1* | 10/2015 | Kozaki | .................... | B60N 2/58 280/730.2 |
| 2016/0129873 A1* | 5/2016 | Sahashi | ................. | B60R 21/207 297/216.13 |

(Continued)

FOREIGN PATENT DOCUMENTS

JP    9-254735    9/1997
JP    2001-180422    7/2001

*Primary Examiner* — Drew Brown
(74) *Attorney, Agent, or Firm* — Greenblum & Bernstein, P.L.C.

(57) ABSTRACT

An air bag is configured such that, at the time of expansion of the air bag, the air bag partially breaks a seat cover and then jumps out of a seat while the air bag pushes aside a first unfolding portion and a second unfolding portion so as to jump out from a jump-out portion. The first unfolding portion and the second unfolding portion are separated from each other by the jump-out portion. At least part of the jump-out portion, the first unfolding portion, and the second unfolding portion are placed in succession without providing any gap therebetween, when viewed from that front side of the seat pad which faces an outside of the seat.

6 Claims, 7 Drawing Sheets

(56) References Cited

U.S. PATENT DOCUMENTS

2016/0167611 A1* 6/2016 Fujiwara ............. B60R 21/2165
297/216.13
2016/0185313 A1* 6/2016 Lafferty ................ B60R 21/201
280/728.3

* cited by examiner

VEHICLE SEAT AND MANUFACTURING METHOD OF SEAT PAD

INCORPORATION BY REFERENCE

The disclosure of Japanese Patent Application No. 2014-226762 filed on Nov. 7, 2014 including the specification, drawings and abstract is incorporated herein by reference in its entirety.

BACKGROUND OF THE INVENTION

1. Field of the Invention

The present invention relates to a vehicle seat including a seat pad, a seat cover covering the seat pad, an air bag inside the seat, and a jump-out portion (a fragile part from which the air bag jumps out of the seat), and a manufacturing method of a seat pad.

2. Description of Related Art

As this type of vehicle seat, there has been known a vehicle seat including a seat cushion, and a seatback rising from the seat cushion (see Japanese Patent Application Publication No. 2001-180422 (JP 2001-180422 A)). In this vehicle seat, the seatback includes a generally arch-shaped seat frame that forms a seat framework, a seat pad for elastically supporting an occupant, an air bag device, and a breaking slit (corresponding to a jump-out portion) provided in the seat pad. The seat pad is typically a member made of foam resin, forming a seat outer shape, and elastically supporting an occupant, and its front side is covered with a seat cover. Further, the air bag device is a housing including an air bag that expands due to inflow of air, and is attached to the seat frame so as to be placed on a seat side portion and a back side of the seat pad.

Further, the breaking slit is a long hole penetrating through the seat pad in its thickness direction, and is formed in that part of a thin side portion of the seat pad which covers the air bag device. In the technique as known in the art, a plurality of breaking slits is formed intermittently on a side face of the seat pad so as to have a generally transverse U shape in a side view. At this time, a bridge portion, which is a normal seat-pad portion, is placed between breaking slits adjacent to each other, so as to prevent as much as possible bending deformation of that side face of the seat pad which is thin and fragile. At the time of a vehicle collision, the air flows into the air bag in response to a signal caused due to the vehicle collision, so that the air bag expands and breaks through a seat-pad portion in which the breaking slits are formed. Further, the air bag that expands pushes aside the seat-pad portion around the breaking slits and jumps out of the seat by partially breaking the seat cover.

SUMMARY OF THE INVENTION

In the meantime, in the technique as known in the art, the bridge portion, which is a normal seat-pad portion, is placed between the breaking slits. On this account, there is such a possibility that, at the time of a vehicle collision, it takes time for the air bag to break the bridge portion, which may delay a timing of jumping out. The breaking slits may be connected together into one to omit the bridge portion, so that the jump-out portion is provided in a wide range, which makes it possible to quicken a jumping-out timing of the air bag. However, in this case, the breaking slits thus connected stand out on the seat cover unexpectedly in a normal time and a highlight or the like is formed, so that the breaking slits are easily observed from outside, which results in a poor design property. The present invention provides a vehicle seat configured such that a jump-out portion serving as a part from which an air bag jumps out can be provided in a seat pad with high performance, and a manufacturing method of a seat pad.

A vehicle seat according to a first aspect of the present invention includes: a seat pad forming a seat outer shape and elastically supporting an occupant; a seat cover covering the seat pad; and an air bag covered with the seat pad and configured to be expandable due to inflow of air. The seat pad includes a jump-out portion which is fragile as compared with other parts of the seat pad and from which the air bag jumps out at the time of expansion of the air bag, a first unfolding portion continued to one side of the jump-out portion, and a second unfolding portion continued to that other side of the jump-out portion which is opposite to the one side. The air bag is configured such that, at the time of expansion of the air bag, the air bag partially breaks the seat cover and then jumps out of the seat while the air bag pushes aside the first unfolding portion and the second unfolding portion so as to jump out from the jump-out portion. The first unfolding portion and the second unfolding portion are separated from each other by the jump-out portion. When viewed from that front side of the seat pad which faces an outside of the seat, at least part of the jump-out portion, the first unfolding portion, and the second unfolding portion are placed in succession without providing any gap therebetween.

In the above aspect, since the unfolding portions and the jump-out portion are placed in succession, at the time when the seat pad is covered with the seat cover, it is possible to prevent as much as possible the jump-out portion from being unexpectedly observed in a transparent manner. Accordingly, even in such a configuration that the jump-out portion is provided in a relatively wide range so as not to obstruct jumping out of the air bag to the utmost, it is possible to cover the jump-out portion of the seat pad with the seat cover with a good design property.

In the above aspect, the first unfolding portion and the second unfolding portion each may include a planar back-surface material integrated with a back side opposite to the front side; and the back-surface material may be hardened due to impregnation of resin; and a part where the back-surface material is not disposed may be provided in a formation part for the jump-out portion, so that the back-surface material of the first unfolding portion is placed away from the back-surface material of the second unfolding portion. In the above configuration, even in a case where the first unfolding portion and the second unfolding portion are placed so as to be close to each other or to abut with each other, their respective back-surface materials are prevented as much as possible from making contact with each other, due to that part of the jump-out portion in which no back-surface material is provided. On this account, even if the unfolding portions move relative to each other, occurrence of abnormal noise caused due to contact (friction or the like) between these back-surface materials can be prevented appropriately.

A manufacturing method of a seat pad, according to a second aspect of the present invention, includes: forming a marked portion having an outer shape or a touch different from other parts of the seat pad, at the same time as molding of the seat pad made of foam resin, so that the marked portion is able to indicate the formation part for the jump-out portion; providing a cut line between the first unfolding portion and the second unfolding portion with the marked portion being taken as a mark, so as to separate the first unfolding portion from the second unfolding portion; and placing at least part of the jump-out portion, the first unfolding portion, and the second unfolding portion in succession without providing any gap therebetween, when viewed from that front side of the seat pad which faces the outside of the seat. In the present aspect, the marked portion can be formed at the same time as molding of the seat pad (the marked portion can be easily formed). At least part of the jump-out portion can be placed between the first unfolding portion and the second unfolding portion, while the first unfolding portion and the second unfolding portion are separated from each other with high accuracy, based on the marked portion.

According to the first aspect of the present invention, the jump-out portion serving as a part from which the air bag jumps out can be provided in the seat pad with high performance. Further, according to the above configuration, the jump-out portion serving as a part from which the air bag jumps out can be provided in the seat pad with further high performance. According to the second aspect of the present invention, it is possible to form the jump-out portion of the seat pad with high performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment for carrying out the present invention with reference to FIGS. 1 to 7. Further, in each of the drawings, a reference sign F is assigned to a vehicle-seat front side, a reference sign B is assigned to a vehicle-seat rear side, a reference sign UP is assigned to a vehicle-seat upper side, a reference sign DW is assigned to a vehicle-seat lower side, a reference sign R is assigned to a vehicle-seat right side, and a reference sign L is assigned to a vehicle-seat left side, appropriately. A vehicle seat 2 in FIG. 1 includes a seat cushion 4, a seatback 6, and a headrest 8. These seat components each includes: a seat frame (4F, 6F, 8F) forming a seat framework; a seat pad (4P, 6P, 8P) forming a seat outer shape; and a seat cover (4S, 6S, 8S) covering the seat pad. In the present embodiment, a lower part of the seatback 6 in an uprising state is connected to a rear part of the seat cushion 4 in a rising and tilting manner, and the headrest 8 is disposed on an upper part of the seatback 6.

Referring now to FIGS. 1 to 4, the seatback 6 of the present embodiment includes basic constituents 6F, 6P, 6S, an air bag 10, related constituents (a first unfolding portion 21, a second unfolding portion 22, a jump-out portion 24, and a back-surface material 30) (details of each portion will be described later). Here, with reference to FIG. 1, the seat frame 6F is a generally arch-shaped frame body, and can be formed by use of a material (metal or hard resin) that has excellent rigidity. Further, with reference to FIGS. 2 to 4, the seat pad 6P (details thereof will be described later) is a member that can elastically support an occupant, and can be formed of foam resin such as polyurethane foam (density: 10 $kg/m^3$ to 60 $kg/m^3$), for example. The seat cover 6S is a face material having a pouch-like shape, and can be formed of fabric (woven fabric, knitted fabric, nonwoven fabric) and leather (natural leather, synthetic leather). In the present embodiment, as will be described later, the seat pad 6P is placed on the seat frame 6F, and then covered with the seat cover 6S. Further, the air bag 10 (details thereof will be described later) is disposed inside a seat, and is placed on a back side of the seat pad 6P.

Figure 1:
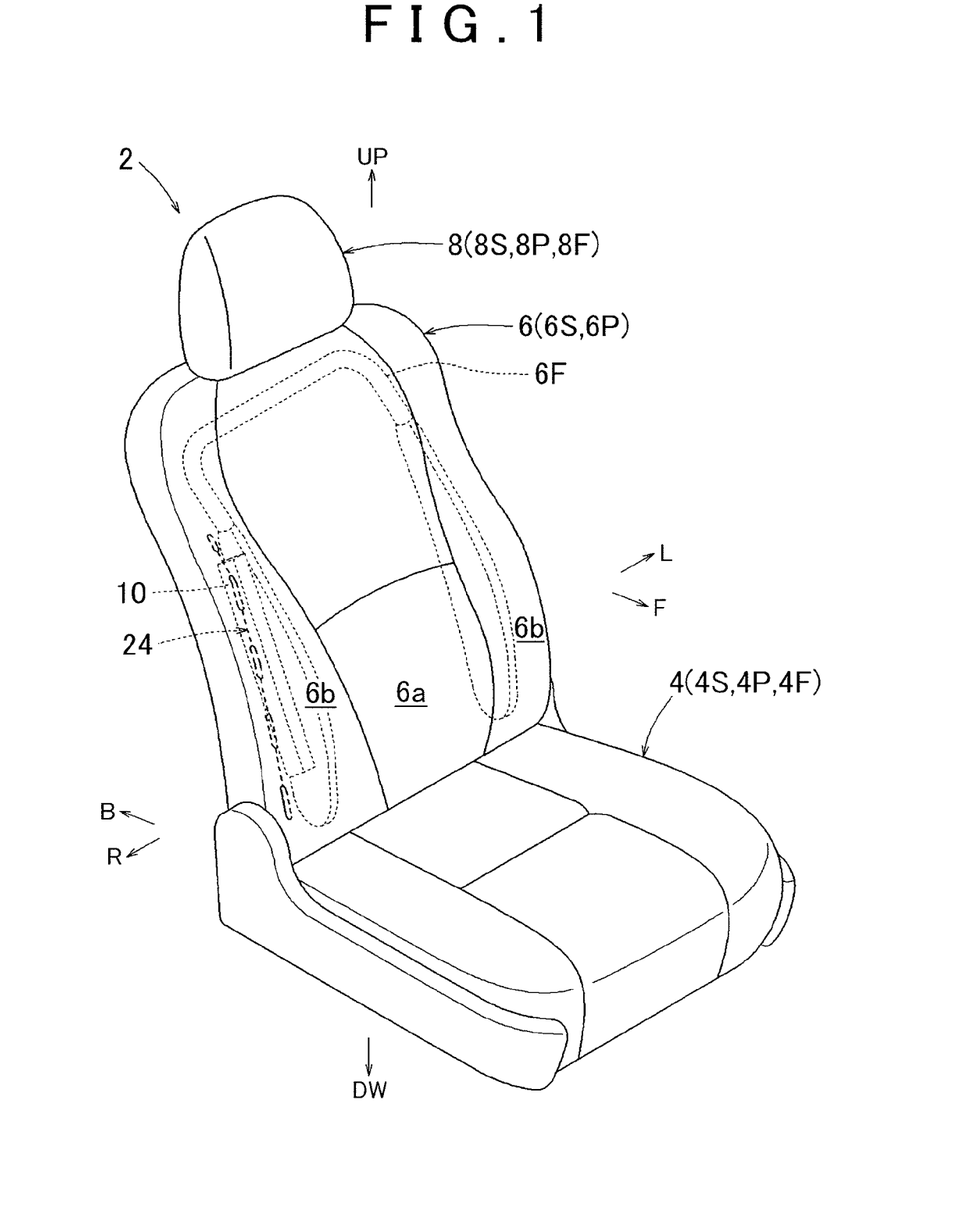
FIG. 1 is a perspective view of a vehicle seat.
Figure 2:
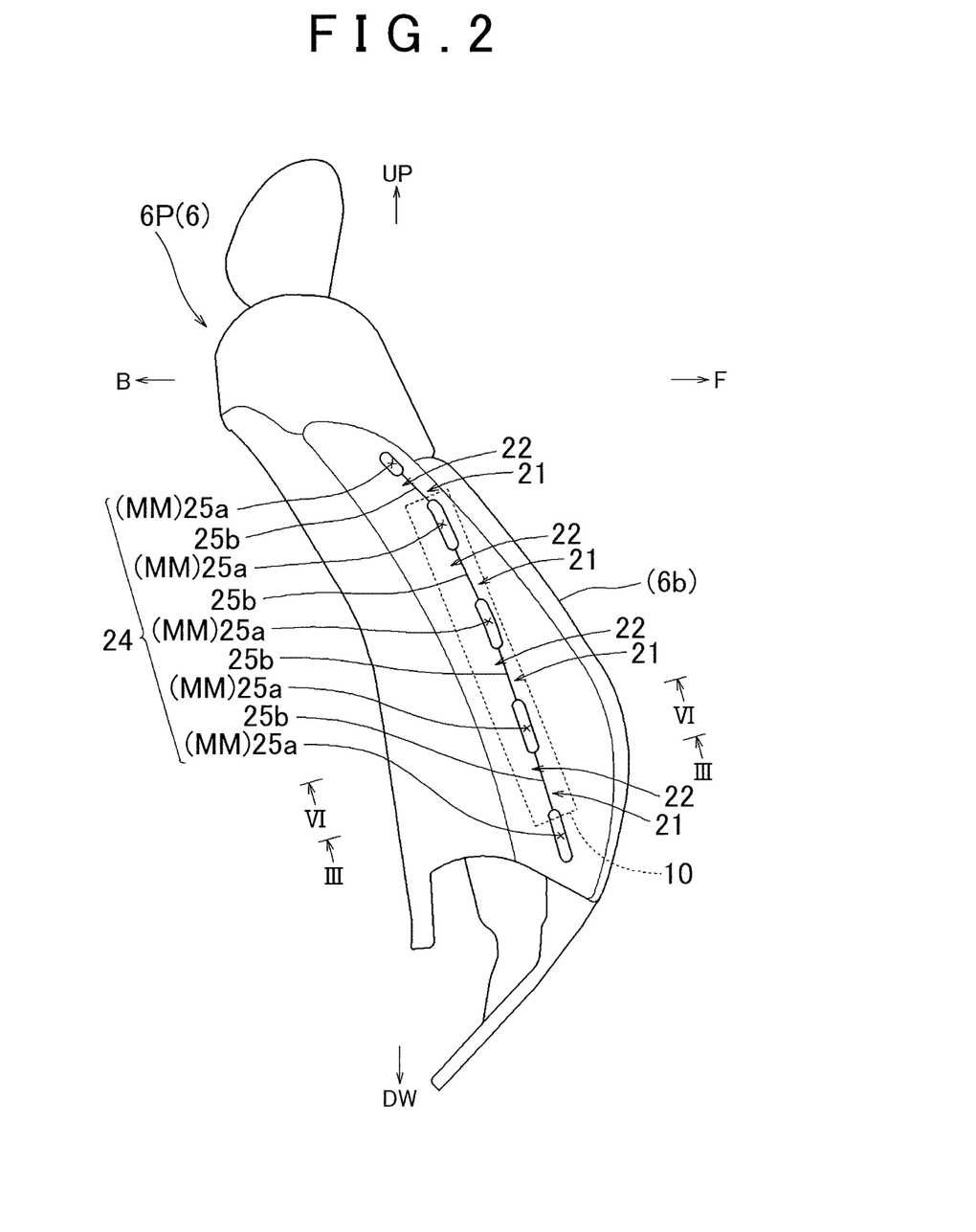
FIG. 2 is a side view of a seat pad viewed from an R direction.
Figure 3:
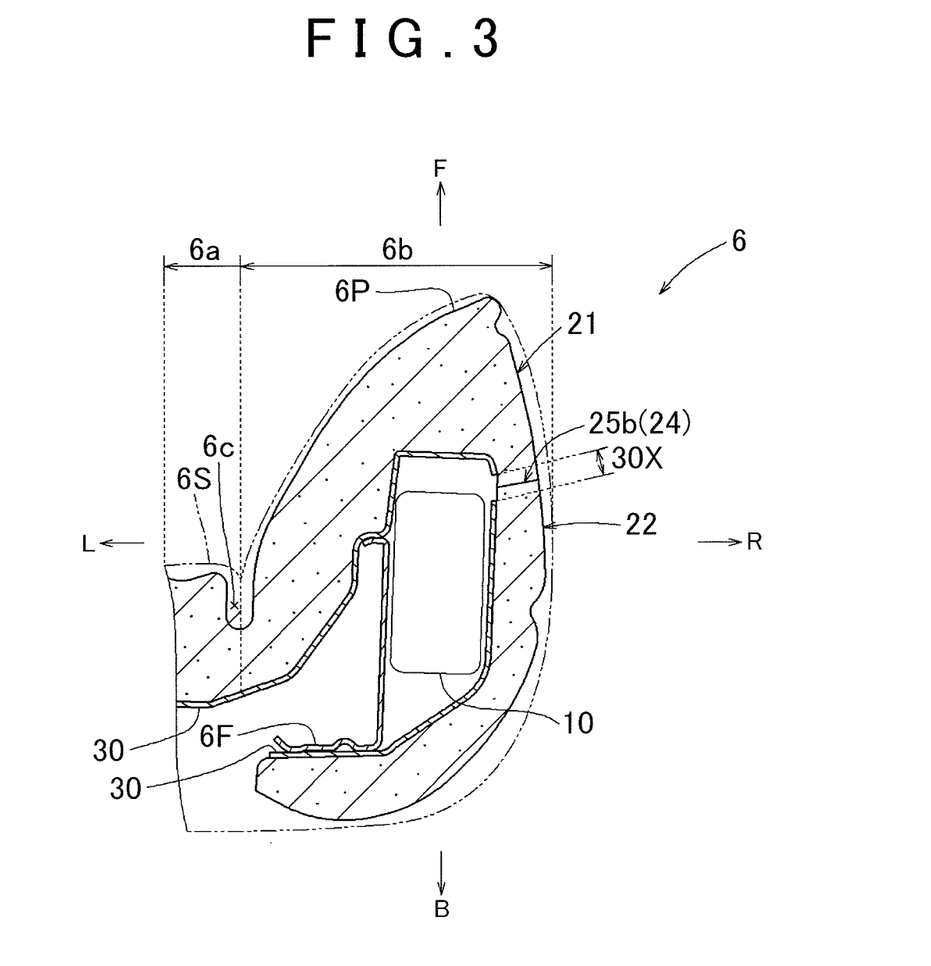
FIG. 3 is a sectional view of part of the seat pad, corresponding to a section taken along a line in FIG. 2.

Referring now to FIGS. 1 to 3, at the time of a vehicle collision or the like, the air bag 10 jumps out of the seat from a side portion (the jump-out portion 24) of the seatback 6, so as to protect a lateral part of the occupant. At this time, while the air bag 10 pushes aside part of the seat pad 6P (mainly, the first unfolding portion 21, the second unfolding portion 22) so as to jump out from the jump-out portion 24, the air bag 10 partially breaks the seat cover 6S and then jumps out of the seat. In this type of configuration, with reference to FIG. 1, at the time when the seat pad 6P is covered, for example, such a situation should be avoided as much as possible that the jump-out portion 24 stands out on the seat cover 6S unexpectedly to form a highlight. In view of this, in the present embodiment, in the after-mentioned configuration, the jump-out portion 24 serving as a part from which the air bag 10 jumps out is provided in the seat pad 6P with high performance. The following described each constituent more specifically.

Referring now to FIGS. 1 to 4, the air bag 10 of the present embodiment is a member having a generally cube shape elongated in a seat up-down direction in an unexpanded state, and is disposed in the side portion of the seatback 6. In the present embodiment, the air bag 10 is fixed to a flat-shaped side frame that forms a side portion of the seat frame 6F and then placed on a seat side face, and then covered with the after-mentioned top-plate side portion 6b of the seat pad 6P. When the air flows into the air bag 10 in response to a signal indicative of a vehicle collision so that the air bag 10 expands and jumps out of the seat, the air bag 10 protects a body range from a chest of the occupant to a lumbar part of the occupant. Note that a gas supply device is placed inside the air bag 10. Gas generant or high-pressure gas is enclosed in the gas supply device (an inflator).

Figure 4:
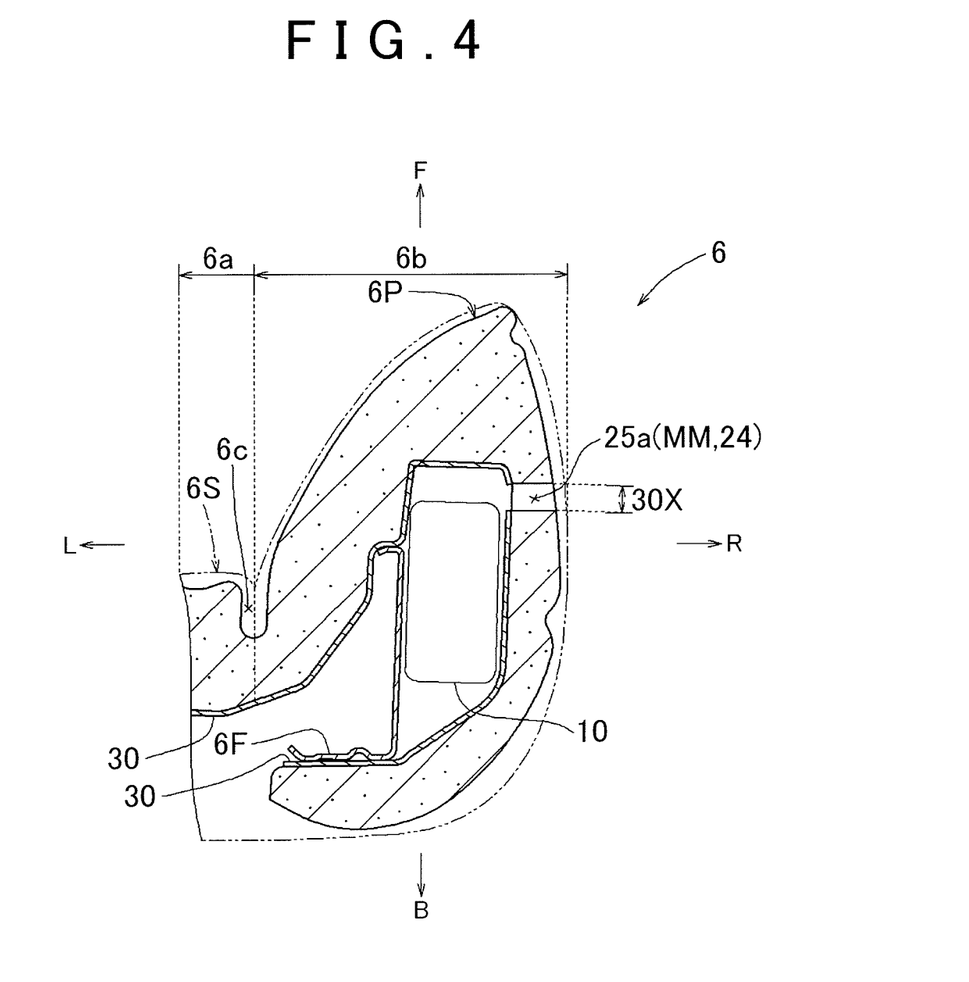
FIG. 4 is a sectional view of part of the seat pad, corresponding to a section taken along a line IV-IV in FIG. 2.

Referring now to FIGS. 1 to 4, the seat pad 6P of the present embodiment has a generally rectangular shape (in a front view), and includes a top-plate main portion 6a, a top-plate side portion 6b, a groove 6c, the after-mentioned back-surface material 30. Here, the top-plate main portion 6a is a flat part at a center of the seat pad 6P in a seat width direction. Further, the top-plate side portion 6b is a projecting part placed on a lateral side of the top-plate main portion 6a, and can support a lateral part of the occupant at the time of cornering, for example. Referring now to FIGS. 2 to 4, the top-plate side portion 6b of the present embodiment has a generally transverse U shape (in a sectional view) that can cover the side portion of the seat frame 6F including the air bag 10, and includes the after-mentioned constituents (the first unfolding portion 21, the second unfolding portion 22, the jump-out portion 24). The groove 6c is a recessed portion formed on a sitting side of the seat pad 6P, and is formed between the top-plate main portion 6a and the top-plate side portion 6b, so that part of the seat cover 6S can be drawn therein via a clip or the like by burying the clip therein, for example.

With reference to FIGS. 2 and 3, the first unfolding portion 21 is a part serving as a sitting side of the top-plate side portion 6b, and the first unfolding portion 21 is placed on a front side (one side) of the after-mentioned jump-out portion 24. The first unfolding portion 21 of the present embodiment has a shape generally rectangular in a sectional view and elongated in the seat width direction, and is gradually thickened toward a seat side portion from an end side adjacent to the top-plate main portion 6a. Further, the second unfolding portion 22 is a relatively thin part serving as a rear side of the top-plate side portion 6b, and the second unfolding portion 22 has a shape generally rectangular in a sectional view and elongated in the seat front-rear direction, and is placed on a rear side of the jump-out portion 24 so as to be continued thereto. In the present embodiment, the air bag 10 is covered with the first unfolding portion 21 and the second unfolding portion 22 in a state where the air bag 10 is attached to the seat from 6F and placed inside the seat.

The jump-out portion 24 is a part which is fragile as compared with other parts of the seat pad and from which the air bag jumps out, and the jump-out portion 24 can be opened (or expanded) by a pressure or the like of the air bag 10 at the time of expansion (see FIGS. 1 to 4). The jump-out portion 24 of the present embodiment includes a plurality of first jump-out portions 25a (marked portions MM) and a plurality of second jump-out portions 25b, and is provided at a position at which the jump-out portion 24 can be opposed to the air bag 10 on a side face of the seat pad 6P (see FIGS. 1 and 2). In the jump-out portion 24 of the present embodiment, the first jump-out portions 25a and the second jump-out portions 25b are placed alternately (continuously) in the seat up-down direction), based on an uprising state of the seatback. Note that a linear dimension (a dimension in the seat up-down direction) of the jump-out portion 24 is not limited in particular as long as the air bag 10 can jump out therefrom, but typically, it is desirable that the linear dimension be set larger than a linear dimension of the air bag 10, so that the air bag 10 can be surely unfolded.

Each of the plurality of first jump-out portions 25a is a hole portion penetrating through the seat pad 6P in its thickness direction. In the present embodiment, based on an uprising state of the seatback, the plurality of first jump-out portions 25a, which is oblong elongated holes, is provided at given intervals in the seat up-down direction along a formation part for the jump-out portion 24. At this time, the first jump-out portions 25a are provided in an upper end and a lower end of the formation part for the jump-out portion 24, so that the second jump-out portions 25b can be easily formed as described later. Further, the second jump-out portions 25b are boundary lines serving as boundaries at which the first unfolding portion 21 makes contact with the second unfolding portion 22, and the second jump-out portions 25b are formed such that both of the unfolding portions 21, 22 abut with each other (details of a formation method thereof will be described later).

With reference to FIGS. 3 and 4, the back-surface material 30 is a face material attached to that part of a back surface of the seat pad 6P which faces the seat frame 6F and the air bag 10. A material of the back-surface material 30 is not limited in particular, but felt and fabric can be exemplified. In the present embodiment, a fabric that can be impregnated with a molding material of the seat pad 6P is used as the back-surface material 30. The back-surface material 30 is integrally attached to respective back surfaces of the top-plate main portion 6a and the top-plate side portion 6b at the same time as molding of the seat pad 6P, which will be described later. At this time, the back-surface material 30 is impregnated with the molding material of the seat pad 6P and hardened.

Figure 5:
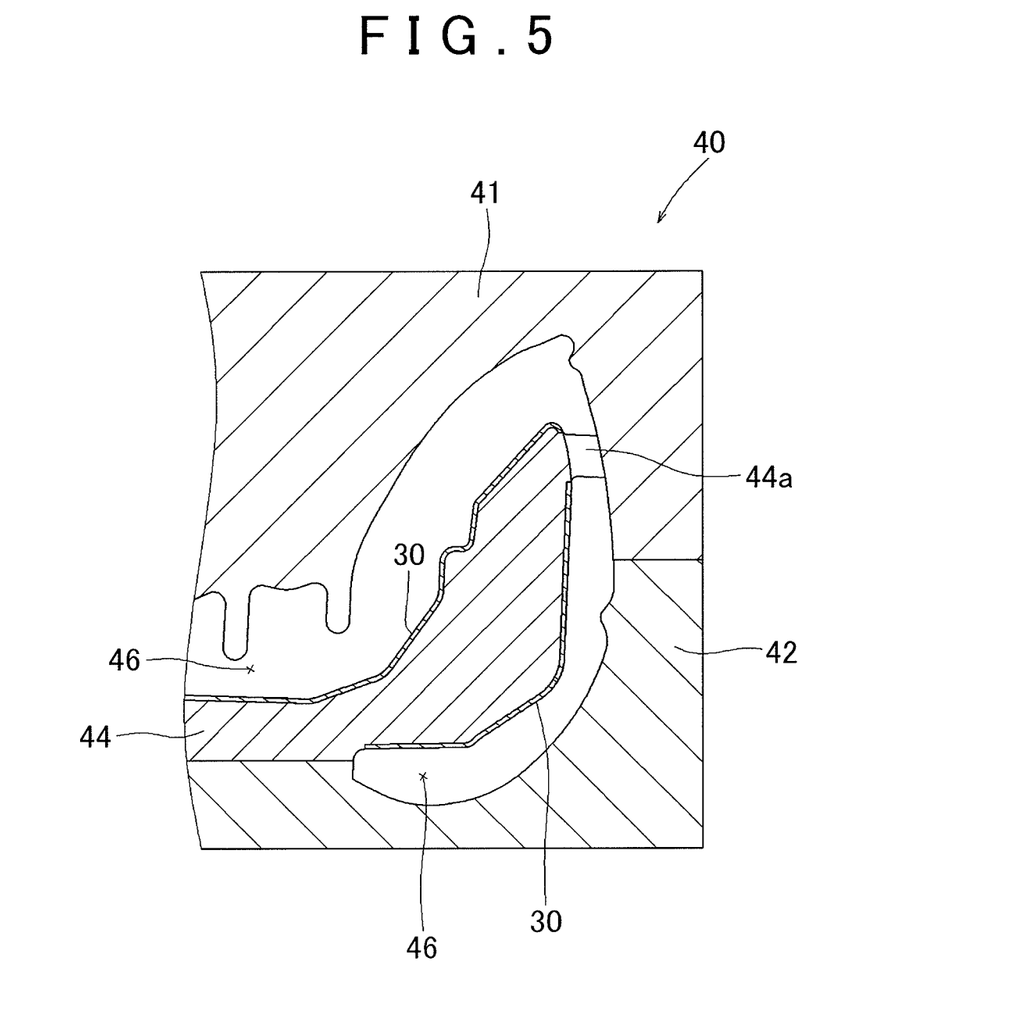
FIG. 5 is a sectional view of part of a molding die.

Referring now to FIGS. 3 to 5, the seat pad 6P is molded by use of a molding device 40 through a first step, a second step, and a third step, which will be described later. Here, with reference to FIG. 5, the molding device 40 of the present embodiment includes a first die 41, a second die 42, an intermediate die 44, projecting portions 44a, and a cavity 46. The first die 41 is a generally rectangular molding die in a sectional view, and has a recessed part having a shape following a sitting face shape of the seat pad (the top-plate main portion, the first unfolding portion). Further, the second die 42 is a generally rectangular molding die in a sectional view so that the second die 42 can close the first die 41 in a fitting manner, and has a recessed part following a side face shape, a rear face, and the like of the seat pad (the second unfolding portion). The intermediate die 44 is a generally rectangular molding die placeable between the first die 41 and the second die 42 and following an inner shape of the seat pad, and the intermediate die 44 has a plurality of projecting portions 44a. In the present embodiment, a surface shape of the intermediate die 44 has a shape following a back surface of the seat pad (the top-plate main portion, the top-plate side portion). Further, each of the projecting portions 44a is a flat part having a shape following an outer shape of the first jump-out portion 25a, and with reference to FIGS. 2 and 5, the projecting portions 44a are placed, in a projecting manner, at given intervals along the formation part for the jump-out portion 24.

In the present embodiment, with reference to FIG. 5, the first die 41 and the second die 42 are closed in an opposed manner with the intermediate die 44 being sandwiched therebetween. Thus, that part of the cavity 46 which can mold a sitting side of the seat pad can be formed between the first die 41 and the intermediate die 44, and the other part of the cavity 46 which can form the side portion of the seat pad and a rear portion thereof can be formed between the second die 42 and the intermediate die 44. In the present embodiment, the plurality of projecting portions 44a projects from the intermediate die 44 (parts where the first jump-out portions are to be placed), and is placed so as to abut with the first die 41 at the time of a mold closing state.

Referring to FIGS. 2 and 4, in the first step, the first jump-out portions 25a (marked portions MM) are formed in the seat pad 6P at the same time as molding of the seat pad 6P. In the present embodiment, with reference to FIG. 5, after the back-surface material 30 is placed in advance around the projecting portions 44a of the intermediate die 44, the molding device 40 is closed, and then a molding material (liquid resin material, not shown) of the seat pad 6P is supplied into the cavity 46. The molding material is foamed in this state, so as to mold the seat pad 6P. Hereby, with reference to FIGS. 3 and 4, the back-surface material 30 is integrated with back surfaces of the first unfolding portion 21 and the second unfolding portion 22, and the back-surface material 30 is hardened due to impregnation and solidification of the molding material.

Further, referring to FIGS. 4 and 5, the first jump-out portions 25a (marked portions MM) are formed at right positions by the projecting portions 44a provided in the intermediate die 44 at the same time as molding of the seat pad. With reference to FIG. 3, in the present embodiment, the plurality of first jump-out portions 25a (marked portions MM) is formed at given intervals along the formation part for the jump-out portion 24 in a seat-pad portion in which the second jump-out portions 25b can be indicated. These first jump-out portions 25a are through holes of the seat pad 6P as described above, and have a different outer shape, as a surface shape, from other seat-pad portions where no through hole is provided.

With reference to FIGS. 2 and 3, in the second step (a step after the molding of the seat pad), cut lines are provided between the first unfolding portion 21 and the second unfolding portion 22 with the first jump-out portions 25a (marked portions MM) being taken as marks, so as to separate the first unfolding portion 21 from the second unfolding portion 22. In the present embodiment, after the seat pad 6P is taken out from the molding device 40, subsequent machining of forming the cut lines between the unfolding portions 21, 22 is performed by use of a cutter member (not shown). At this time, in the present embodiment, the plurality of first jump-out portions 25a (marked portions MM) is placed at given intervals along the formation part for the jump-out portion 24. In view of this, by forming a cut line extending in the up-down direction between first jump-out portions 25a (marked portions MM) adjacent to each other in the up-down direction, the first unfolding portion 21 can be separated by cutting from the second unfolding portion 22 with accuracy. Further, in the present embodiment, the first jump-out portions 25a are provided in the upper end and the lower end of the formation part for the jump-out portion 24. This makes it possible to provide the second jump-out portions 25b at right positions by providing the cut lines between the unfolding portions 21, 22 so as not to stick out on upper and lower sides. Further, in the present embodiment, in the first unfolding portion 21, that end part of the back-surface material 30 which is on a second-jump-out-portion-25b side is removed, and also in the second unfolding portion 22, that end part of the back-surface material 30 which is on a second-jump-out-portion-25b side is removed.

With reference to FIGS. 2 and 3, in the third step, the second jump-out portions 25b, the first unfolding portion 21, and the second unfolding portion 22 are placed in succession, when viewed from a front side of the seat pad 6P. In the present embodiment, by placing the first unfolding portion 21 and the second unfolding portion 22 in an abutting manner, the second jump-out portions 25b (boundaries) are formed therebetween. By placing the unfolding portions 21, 22 in an abutting manner (in a tightly adhered manner), the second jump-out portions 25b (boundaries), the first unfolding portion 21, and the second unfolding portion 22 can be placed in succession without providing any gap therebetween.

Further, in the present embodiment, in each of the unfolding portions 21, 22, that end part of the back-surface material 30 which is on the second-jump-out-portion-25b side is removed, as described above. Accordingly, with reference to FIG. 3, since the second jump-out portions 25b are provided between the unfolding portions 21, 22, a part 30X in which no back-surface material 30 is disposed is formed in this area. Further, with reference to FIG. 4, also in the first jump-out portions 25a, since the back-surface material 30 is not disposed at the projecting portions 44a at the time of molding of the seat pad 6P, a part 30X in which no back-surface material 30 is disposed is formed in a similar manner. Thus, in the present embodiment, the part 30X in which no back-surface material 30 is disposed is formed in the jump-out portion 24 (the first jump-out portions 25a and the second jump-out portions 25b) so as to extend in the seat up-down direction.

With reference to FIGS. 3 and 4, the seat pad 6P is placed on the seat frame 6F, and then covered with the seat cover 6S. In the present embodiment, in consideration of outward appearance or the like of the seat, a sitting face, a side face, etc., of the seat pad 6P are covered while the seat cover 6S having a pouch-like shape is put thereon in a tightly adhered manner. At this time, in the present embodiment, the second jump-out portions 25b, the first unfolding portion 21, and the second unfolding portion 22 are provided in succession without providing any gap therebetween. This prevents as much as possible the second jump-out portions 25b from unexpectedly standing out on the seat cover 6S, thereby making it possible to maintain the design property of the seat appropriately. Further, in the present embodiment, the part 30X in which no back-surface material 30 is disposed is provided along the formation portion for the jump-out portion 24, so that the back-surface material 30 of the first unfolding portion 21 is placed away from the back-surface material 30 of the second unfolding portion 22. On this account, even if the unfolding portions 21, 22 relatively move at the time of assembling or at the time when an occupant sits (in a normal time), occurrence of abnormal noise caused due to abutment (friction) between these back-surface materials 30 can be prevented appropriately.

With reference to FIGS. 3 and 4, the air bag 10 jumps out of the seat due to an impact at the time of a vehicle collision, so as to protect a lateral part of the occupant. At this time, while the air bag 10 pushes aside the first unfolding portion 21 and the second unfolding portion 22 so as to jump out from the jump-out portion 24, the air bag 10 partially breaks the seat cover 6S and then jumps out of the seat. In the present embodiment, the first jump-out portions 25a and the second jump-out portions 25b are formed continuously in the seat up-down direction, so that the jump-out portion 24 is formed in a relatively wide range. On this account, in the present embodiment, the air bag 10 can jump out from the jump-out portion 24 smoothly, thereby making it possible to quicken a jumping-out timing of the air bag 10.

As described above, according to the present embodiment, the second jump-out portions 25b and the unfolding portions 21, 22 are placed in succession. On this account, at the time when the seat pad 6P is covered with the seat cover 6S, it is possible to prevent as much as possible the jump-out portion 24 from standing out unexpectedly in a transparent manner. Accordingly, even in such a configuration that the jump-out portion 24 is provided in a relatively wide range so as not to obstruct the jumping out of the air bag 10 as much as possible, it is possible to cover the jump-out portion 24 of the seat pad 6P with the seat cover 6S with a good design property. Further, in the present embodiment, even in a case where the first unfolding portion 21 and the second unfolding portion 22 are placed so as to be close to each other or to abut with each other, their respective back-surface materials 30 are prevented as much as possible from making contact with each other due to that part 30X of the jump-out portion 24 in which no back-surface material 30 is provided. On this account, even if the unfolding portions 21, 22 move relative to each other, occurrence of abnormal noise caused due to contact (friction) between their back-surface materials 30 can be prevented appropriately. Thus, according to the present embodiment, the jump-out portion 24 serving as a part from which the air bag 10 jumps out can be provided in the seat pad 6P with high performance.

Further, in the present embodiment, the first jump-out portions 25a (marked portions MM) can be formed at the same time as molding of the seat pad 6P. The second jump-out portions 25b can be also placed between the first unfolding portion 21 and the second unfolding portion 22, while the first unfolding portion 21 and the second unfolding portion 22 are separated from each other with high accuracy, based on the marked portions MM.

Here, the configuration of the marked portions may employ various configurations, in addition to the configuration of the abovementioned first jump-out portions 25a (marked portions MM). For example, in Modification 1, with reference to FIG. 6, a plurality of marked portions (a first marked portion MM1 to a fourth marked portion MM4) is provided on a side face of a seat pad 6P. Each of the plurality of marked portions MM1 to MM4 is a grooved part, which is not a through hole, on a surface of the seat pad 6P, and has a small irregularity as compared with a case where a through hole is provided in the seat pad, and thus, each of the plurality of marked portions MM1 to MM4 has a different outer shape from other seat-pad portions. In the present modification, the plurality of marked portions MM1 to MM4 is placed so as to surround a formation position for a jump-out portion 24A, thereby indicating the jump-out portion 24A. That is, the first marked portion MM1 is a linear groove extending in the seat up-down direction along a formation part for the jump-out portion 24A, based on an uprising state of the seatback, and the first marked portion MM1 is placed on a front side of the formation part. Further, the second marked portion MM2 is also a linear groove extending in the seat up-down direction, and placed on a rear side of the formation part for the jump-out portion 24A. Further, the third marked portion MM3 is a generally reverse U-shaped groove, and placed in a seat-pad portion on an upper side relative to the formation part for the jump-out portion 24A. Then, the fourth marked portion MM4 is a generally U-shaped groove, and placed in a seat-pad portion on a lower side relative to the formation part for the jump-out portion 24A.

Figure 6:
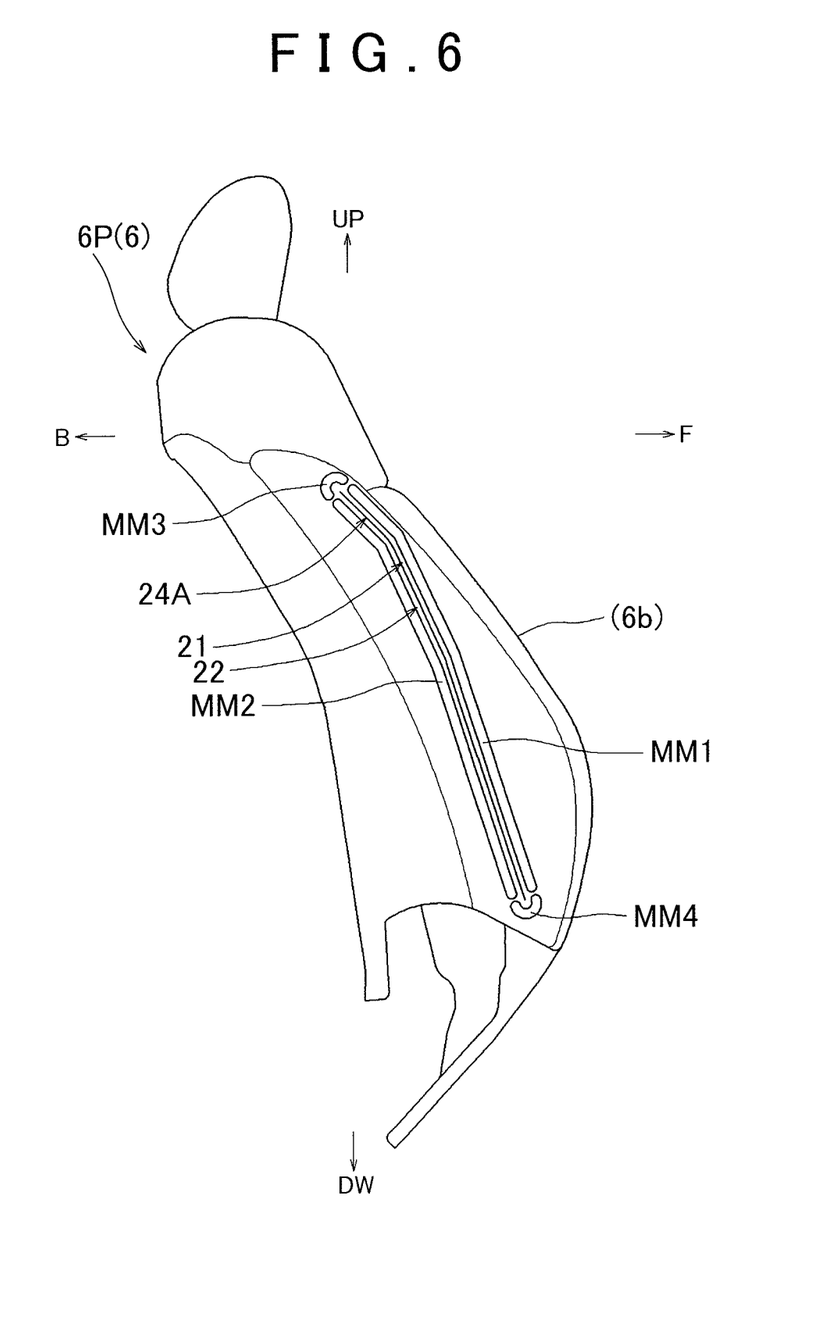
FIG. 6 is a side view of a seat pad according to Modification 1.

In the present modification, the marked portions MM1 to MM4 can be provided appropriately at the same time as molding of the seat pad 6P or after molding of the seat pad 6P. For example, in a case where the marked portions MM1 to MM4 are provided at the same time as molding of the seat pad 6P, a plurality of projecting portions (not shown) is provided in the first die of Embodiment 1, for example, so as to be placed at respective formation positions of the marked portions MM1 to MM4. Thus, the plurality of marked portions MM1 to MM4 can be formed by the projecting portions at the same time as molding of the seat pad 6P. With each of the marked portions MM1 to MM4 being used as a mark, a cut line extending in the up-down direction is provided therein, so as to separate, by cutting, a first unfolding portion from a second unfolding portion, and then, the first unfolding portion is made abut with the second unfolding portion. In this way, the linear jump-out portion 24A is formed between the first unfolding portion and the second unfolding portion so as to extend continuously in the seat up-down direction.

Figure 7:
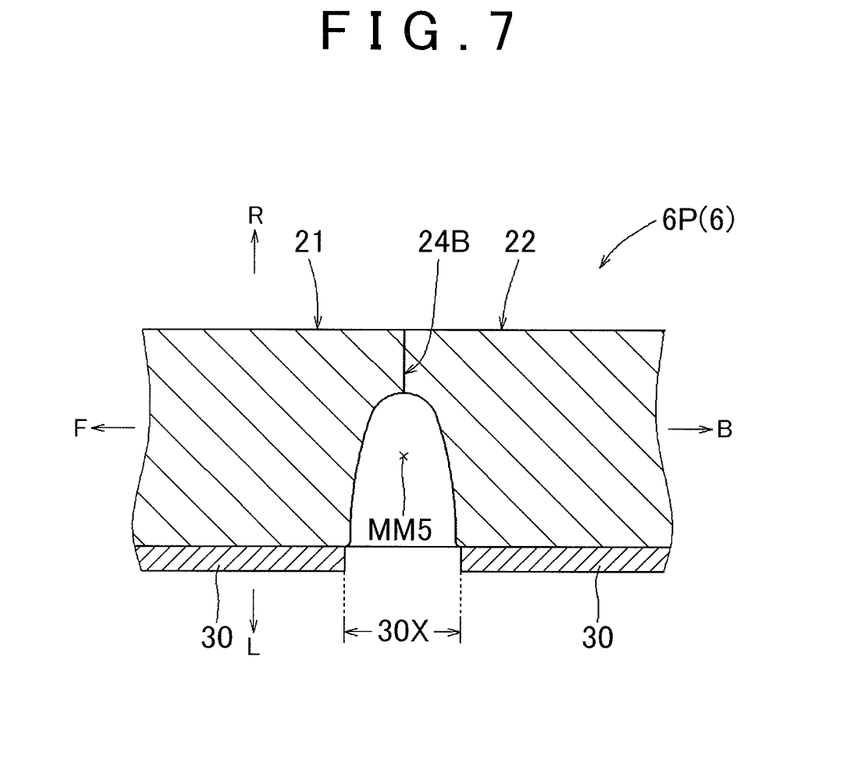
FIG. 7 is a sectional view of part of a seat pad according to Modification 2.

Further, in Modification 2, with reference to FIG. 7, a recessed portion (a fifth marked portion MM5) is linearly provided on a back side of a seat pad 6P and placed along a formation part for a jump-out portion 24B. When the fifth marked portion MM5 (the recessed portion) is provided in the seat pad 6P so as to partially reduce a thickness as such, it is possible to achieve a different touch from other seat-pad portions. Then, a first unfolding portion 21 is separated by cutting from a second unfolding portion 22 with the help of the touch of such a thinned part with the fifth marked portion MM5 being used as a mark, and then, the first unfolding portion 21 and the second unfolding portion 22 are placed in an abutting manner. Hereby, the jump-out portion 24B (a boundary) can be provided. In the present modification, the seat-pad portion to become the fifth marked portion MM5 is thinned so as to form a cut line smoothly, thereby making it possible to easily perform a dividing operation of the unfolding portions 21, 22.

The vehicle seat of the present embodiment is not limited to the above embodiment, and other various embodiments can be employed. The present embodiment describes an example in which the first unfolding portion 21 and the second unfolding portion 22 are placed in an abutting manner so as to form the second jump-out portions 25b (boundaries) therebetween, but is not intended to limit the configuration of the second jump-out portions. For example, the second jump-out portions can be formed by providing another member (a breakable resin piece, a breakable face material, and the like) that is more fragile than other seat-pad portions, between the first unfolding portion and the second unfolding portion, and at this time, the first unfolding portion, the second unfolding portion, and the another member can be integrated with each other by bonding or the like. Note that, as long as the jumping out of the air bag is not extremely obstructed, the another member (a resin piece or a face material that has a strength equivalent to or more than the other seat-pad portions) can be maintained in a state where the another member is simply sandwiched between the unfolding portions.

Further, the present embodiment exemplifies the configurations of the jump-out portion 24 (25a, 25b) and the like, but is not intended to limit the configurations of these portions. For example, in the present embodiment, the configuration (a shape, a dimension, a formation position, a formation number, and the like) of the first jump-out portions can be modified appropriately according to a seat configuration, and the first jump-out portions can be made smaller than the second jump-out portions, as long as the first jump-out portions can function as marked portions, for example. Further, the configuration of the second jump-out portions can be also modified appropriately, and the second jump-out portions can have various shapes (various shapes such as a linear shape, a zigzag shape, and a wave shape), for example. A formation position of the jump-out portion is modifiable appropriately according to a placement position of the air bag, and can extend in a given direction, e.g., the seat up-down direction or the seat width direction.

Further, the present embodiment exemplifies configurations (a shape, a dimension, a formation position, a formation number, and the like) of the marked portions MM and so on, but is not intended to limit the configurations of these portions. For example, such a configuration can be employed for the marked portion that a wire rod such as a wire material is buried (by insert molding or the like) in the seat pad along the formation position of the jump-out portion. By burying the wire rod as such, it is possible to achieve a different touch or appearance from other seat-pad portions. Further, in Modification 1, the plurality of marked portions (grooves) is provided, but projecting marked portions (having a projecting dimension that does not extremely stand out on the seat cover) can be provided. Further, each of the marked portions in Modification 1 can be provided continually or intermittently in the seat up-down direction, and can be formed at the formation position of the jump-out portion. Further, the marked portions of the present embodiment and the marked portions of the modification can be used in combination appropriately.

Further, the present embodiment exemplifies a configuration (a shape, a dimension, and the like) of the seat pad 6P, but is not intended to limit the configuration of this member. For example, the present embodiment describes an example in which the back-surface material 30 is provided on the back side of the seat pad 6P, but the configuration (a shape, a dimension, a disposition position, a disposition number, and the like) of the back-surface material can be modified appropriately, and the back-surface material may be omitted.

Further, the configuration (seat constituent components, the air bag, and the like) of the vehicle seat 2 of the present embodiment and the configuration of the molding device 40 can be modified appropriately. Further, in the present embodiment, the seatback is mainly described as an example, but the configuration of the present embodiment is applicable to various seat constituent components such as a seat cushion. Further, the configuration of the present embodiment is applicable to general vehicle seats of a vehicle, an aircraft, an electric railcar, and the like.

What is claimed is:

1. A vehicle seat comprising:
   a seat pad that defines a seat outer shape and that is configured to support an occupant;
   a seat cover that covers the seat pad; and
   an air bag that is covered with the seat pad and that is configured to expand due to an inflow of a gas, wherein
   the seat pad includes a jump-out portion which has a greater fragility than other portions of the seat pad and from which at least a portion of the air bag is configured to expand out of the seat pad due to an expansion of the air bag,
   the other portions of the seat pad including a first unfolding portion provided at one side of the jump-out portion, and a second unfolding portion provided at an other side of the jump-out portion which is opposed to the one side,
   the air bag is configured such that, due to an expansion of the air bag, the air bag partially breaks the seat cover and expands out of the seat pad while the air bag pushes aside the first unfolding portion and the second unfolding portion so as to expand out from the jump-out portion,
   the first unfolding portion and the second unfolding portion are separated from each other by the jump-out portion,
   when viewed from a front side of the seat pad which faces an outside of the seat and when the air bag has not expanded, at least parts of the jump-out portion, the first unfolding portion, and the second unfolding portion are arranged in succession without any gap provided therebetween,
   the jump-out portion includes at least one first jump-out portion, which defines a hole that penetrates through the seat pad, and at least one second jump-out portion, and
   when the air bag has not expanded the at least one second jump-out portion defines a boundary at which the first unfolding portion makes contact with the second unfolding portion.

2. The vehicle seat according to claim 1, wherein
   the first unfolding portion and the second unfolding portion each includes a planar back-surface material integrated with a back side of the seat pad that is opposed to the front side of the seat pad,
   the back-surface material is hardened due to impregnation of resin, and
   a formation part for the jump-out portion is provided at a position where the back-surface material is not disposed so that the back-surface material of the first unfolding portion is provided away from the back-surface material of the second unfolding portion.

3. The vehicle seat according to claim 2, wherein the at least one first jump-out portion includes a plurality of first jump-out portions and the at least one second jump-out portion includes a plurality of second jump-out portions, and
   the plurality of first jump-out portions are provided alternately with the plurality of second jump-out portions in a seat up-down direction.

4. The vehicle seat according to claim 1, wherein the at least one first jump-out portion includes a plurality of first jump-out portions and the at least one second jump-out portion includes a plurality of second jump-out portions, and
   the plurality of first jump-out portions are provided alternately with the plurality of second jump-out portions in a seat up-down direction.

5. A manufacturing method of a seat pad for a vehicle seat comprising the seat pad that defines a seat outer shape and that is configured to support an occupant, a seat cover that covers the seat pad, and an air bag that is covered with the seat pad and that is configured to expand due to an inflow of a gas, wherein the seat pad includes a jump-out portion which has a greater fragility than other portions of the seat pad and from which at least a portion of the air bag is configured to expand out of the seat pad due to an expansion of the air bag, the other portions of the seat pad including a first unfolding portion provided at one side of the jump-out portion, and a second unfolding portion provided at an other side of the jump-out portion which is opposed to the one side, the air bag is configured such that, due to an expansion of the air bag, the air bag partially breaks the seat cover and expands out of the seat pad while the air bag pushes aside the first unfolding portion and the second unfolding portion so as to expand out from the jump-out portion, the first unfolding portion and the second unfolding portion are separated from each other by the jump-out portion, when viewed from a front side of the seat pad which faces an outside of the seat and when the air bag has not expanded, at least parts of the jump-out portion, the first unfolding portion, and the second unfolding portion are arranged in succession without any gap provided therebetween, the manufacturing method comprising:
   forming a marked portion having at least one of an outer shape and a touch different from the other portions of the seat pad, at the same time as molding of the seat pad out of foam resin, so that the marked portion is able to indicate a formation part for the jump-out portion;
   providing a cut line between the first unfolding portion and the second unfolding portion with the marked portion being taken as a mark, so as to separate the first unfolding portion from the second unfolding portion; and
   placing at least the parts of the jump-out portion, the first unfolding portion, and the second unfolding portion in succession without any gap provided therebetween, when viewed from the front side of the seat pad which faces the outside of the seat and when the air bag has not expanded out of the jump-out portion.

6. A manufacturing method of a seat pad for a vehicle seat comprising the seat pad that defines a seat outer shape and that is configured to support an occupant, a seat cover that covers the seat pad, and an air bag that is covered with the seat pad and that is configured to expand due to an inflow of a gas, wherein the seat pad includes a jump-out portion which has a greater fragility than other portions of the seat pad and from which at least a portion of the air bag is configured to expand out of the seat pad due to an expansion of the air bag, the other portions of the seat pad including a first unfolding portion provided at one side of the jump-out portion, and a second unfolding portion provided at an other side of the jump-out portion which is opposed to the one side, the air bag is configured such that, due to an expansion of the air bag, the air bag partially breaks the seat cover and expands out of the seat pad while the air bag pushes aside the first unfolding portion and the second unfolding portion so as to expand out from the jump-out portion, the first unfolding portion and the second unfolding portion are separated from each other by the jump-out portion, when viewed from a front side of the seat pad which faces an outside of the seat, when the air bag has not expanded, at least parts of the jump-out portion, the first unfolding portion, and the second unfolding portion are arranged in succession without any gap provided therebetween, the first unfolding portion and the second unfolding portion each includes a planar back-surface material integrated with a back side of the seat pad that is opposed to the front side of the seat pad, the back-surface material is hardened due to impregnation of resin, and a formation part for the jump-out portion is provided at a position where the back-surface material is not disposed so that the back-surface material of the first unfolding portion is provided away from the back-surface material of the second unfolding portion, the manufacturing method comprising:

forming a marked portion having at least one of an outer shape and a touch different from the other portions of the seat pad, at the same time as molding of the seat pad out of foam resin, so that the marked portion is able to indicate a formation part for the jump-out portion;

providing a cut line between the first unfolding portion and the second unfolding portion with the marked portion being taken as a mark, so as to separate the first unfolding portion from the second unfolding portion; and     placing at least the parts of the jump-out portion, the first unfolding portion, and the second unfolding portion in succession without any gap provided therebetween, when viewed from the front side of the seat pad which faces the outside of the seat and when the air bag has not expanded out of the jump-out portion.

\* \* \* \* \*